United States Patent [19]

Duchene et al.

[11] Patent Number: 4,511,618
[45] Date of Patent: Apr. 16, 1985

[54] LAMINATED REFLECTIVE PANELS

[75] Inventors: Eloi Duchene, Gerpinnes; Pierre Laroche, Ham-sur-Heure, both of Belgium

[73] Assignee: Glaverbel, Brussels, Belgium

[21] Appl. No.: 544,810

[22] Filed: Oct. 24, 1983

Related U.S. Application Data

[63] Continuation of Ser. No. 370,523, Apr. 21, 1982, abandoned.

[30] Foreign Application Priority Data

Apr. 24, 1981 [GB] United Kingdom ............... 8112661

[51] Int. Cl.³ .................... B32B 7/02; B32B 27/40; B32B 31/00; G02B 5/08
[52] U.S. Cl. ............................ 428/215; 428/428; 428/432; 428/441; 350/601; 156/297
[58] Field of Search ............. 428/432, 426, 428, 441, 428/215; 65/102, 99.5, 111, 114; 126/438; 350/280, 292; 156/297

[56] References Cited

U.S. PATENT DOCUMENTS

| 2,247,058 | 6/1941 | Irby | 428/432 |
| 2,468,568 | 4/1969 | McCusker | 428/432 |
| 3,447,857 | 6/1969 | McCartney | 65/114 |
| 4,217,391 | 8/1980 | Kaltz | 428/428 |
| 4,422,893 | 12/1983 | Duchateau et al. | 350/292 |

FOREIGN PATENT DOCUMENTS

| 2805813 | 8/1979 | Fed. Rep. of Germany . |
| 1080050 | 12/1954 | France . |
| 1578074 | 10/1980 | United Kingdom ............... 428/432 |

OTHER PUBLICATIONS

Chemical Abstracts, vol. 82, 11, (1975), 71597d.
Chemical Abstracts, vol. 77, 25, (1972), 161310f.
Korzybski et al., *Antibiotics; Origin, Nature and Properties*, vol. I, PWN-Polish Scientific Publishers, (1967), pp. 31–32.

Primary Examiner—George F. Lesmes
Assistant Examiner—Beverly K. Johnson
Attorney, Agent, or Firm—Spencer & Frank

[57] ABSTRACT

A laminated reflective panel comprises at least one mirror sheet which is less than 2.0 mm in thickness and which bears a reflective coating on its rear face. Each mirror sheet is laminated to a flat glass backing sheet which is thicker than the mirror sheet. The backing sheet is preferably of float glass.

15 Claims, 5 Drawing Figures

LAMINATED REFLECTIVE PANELS

This application is a continuation of application Ser. No. 370,523, filed Apr. 21, 1982 now abandoned.

BACKGROUND OF THE INVENTION

This invention relates to laminated reflective panels. Such panels have many potential uses, but a particular use lies in the field of solar concentrators.

When using a back-silvered mirror, it is clear that a proportion of the incident energy will be absorbed as it travels through the thickness of the sheet material. It is accordingly desirable that such a mirror should be as thin as possible in order to reduce this absorption, but this leads to fragility of the mirror.

SUMMARY OF THE INVENTION

It is an object of the present invention to remedy the above situation by providing a mirror as thin as possible without enhancing the fragility of the mirror.

According to the present invention there is provided a laminated reflective panel, characterised in that such panel comprises at least one glass sheet (hereinafter referred to as the mirror sheet) which is less than 2.0 mm in thickness, and which bears a reflective coating on its rear face which is laminated to a flat glass backing sheet which is thicker than the or each mirror sheet.

The thin mirror sheet serves to protect its reflective surface against tarnishing while absorbing very little incident radiation. The flat glass backing sheet provides a support for the mirror sheet and may be made as thick as desired to provide strength to the panel. The backing sheet is made of glass because this material can easily be formed with a flat surface. Any or all glass sheets of the panel may be tempered if desired, for example chemically tempered to provide an increased resistant to breakage.

The backing sheet is preferably formed of float glass to give it an improved planeity over drawn sheet glass without being as expensive as plate glass. Such float glass is preferably at least 4 mm in thickness to provide adequate strength. Float glass having a thickness in the range 5 to 6 mm has particularly good planeity.

As is well known, in the manufacture of float glass, glass is introduced at one end of a float chamber containing a tank of molten metal and is drawn along the tank floating on the metal as a ribbon. Preferably, the or each mirror sheet is bonded to that face of the backing sheet which was in contact with the metal in the float tank during its manufacture. That face, often called the "tin face" because the molten metal used is generally tin (or predominantly tin) has better planeity than the other face (often called the "air face"). In a finished sheet of float glass the tin face can be distinguished from the air face by the proportions of metal ions in the surfaces of the sheet.

The or each said mirror sheet is preferably of drawn glass, since it is much easier to draw glass (for example by the Libby-Owens, Fourcault or Pittsburgh process) of the required low thickness than to make it by any other method.

Because of the low thickness of the mirror sheet it is fragile prior to its bonding to the backing sheet and this can give rise to handling problems in the case of large mirror sheets. It is accordingly preferred to bond a plurality of said mirror sheets to a common backing sheet, especially in the manufacture of large reflective panels such as are commonly used in heliostats. Purely by way of example, three mirror sheets measuring 1.2 by 1.5 meters may be bonded to a common backing sheet measuring 3.6 by 1.5 meters. Of course the mirror sheet area and the backing sheet area need not be co-extensive, and in some embodiments of the invention a margin of the backing sheet remains clear so that it and it alone may be clamped in a frame. This avoids frame clamping pressure on the mirror sheets.

When a ribbon of glass is stretched during its manufacture in a glass drawing machine, there may be microscopic differences in the thickness of the ribbon across its width which are manifest as surface ripples whose crests and troughs are aligned with the direction of drawing. In order that any such defects be aligned in the same sense in a panel according to the invention to promote its reflective efficiency it is preferred that the drawing directions of each of a said plurality of mirror sheets bonded to a common backing sheet should lie substantially parallel to one another. Such drawing directions may be aligned in the same direction or in opposite directions. Furthermore, if the laminated panel is curved after assembly, as it may be to form for example a cylindrical heliostat, the concentration of reflected light is less affected by the longitudinal defects referred to when the mirror sheet drawing directions are parallel to the axis of curvature.

When a ribbon of float glass is drawn across the surface of a bath of molten metal it may likewise have surface irregularities aligned with its drawing direction. Planeity of the reflective surface is improved when the drawing direction of the or each mirror sheet and the drawing direction of the backing sheet are aligned transversely and preferably substantially perpendicularly.

It is convenient to manufacture panels according to the invention from rectangular sheets, the drawing direction of each of which is substantially parallel to its longer sides. The or each mirror sheet is preferably between 0.6 mm and 1.5 mm in thickness. This gives a good compromise between case of handling prior to assembly and low light absorption in use.

Referring now to the bonding material used for laminating the sheets together, use can be made for example of one or more film-forming polymers which may be applied in sheet, e.g. thin foil, form and caused to adhere to the laminate plies by subjecting the assembly to heat and pressure.

One such bonding medium is polyvinylbutyral. This material is convenient to use and enables very strong glass/glass bonds to be achieved which are durable under a useful range of temperature and other fluctuating environmental conditions.

Examples of other bonding media which have been found to give very good results are in the class of epoxy resins, silicone-based adhesives, polyurethane adhesives and hot-melt adhesives.

The hot-melt adhesive is preferably one which is molten at a temperature of 150° C., or lower, preferably between 60° and 120° C.

In preferred embodiments of the invention, the glass sheets are bonded together by means of two or more different bonding media. For example the invention includes reflectors in which said sheets are bonded together by means of two or more bonding layers of different compositions. In certain products in this category the said sheets are bonded together by means of an adhesively coated thermoplastics foil applied as such between the glass sheets prior to application of laminating conditions, normally heat and/or pressure. A specific example giving very good results employs for the bonding function a foil of a polyester bearing a coating of an acrylic resin based adhesive on each side thereof. Such double-coated foils are commercially available. Suitable such foils are for example those marketed under the Trade Marks MACBOND 2800 and MACBOND 2132. These adhesive-coated foils have the advantage of resisting changes in thickness due to localised pressure so that planeity is conserved.

The actual bonding step in the manufacture of the reflector may be achieved by means of calender rolls or by means of a press. In order to avoid occlusions of air or other gases between the sheets, bonding under heat and pressure can be achieved within a chamber in which the assembly of sheets and bonding medium or bonding media is subjected to a predetermined schedule of heat and pressure variations. The margins of the assembly may be placed in communication with a suction device by which suction forces are propagated to the inter-sheet zone to promote evacuation of gases therefrom. The exertion of such suction force can be controlled in timed relation to the incidence of predetermined ambient heat and/or pressure conditions in the course of a heating and pressing cycle within a said chamber. Such bonding techniques are known per se in relation to the manufacture of other kinds of laminates, in particular in the manufacture of laminated vehicle windscreens.

The said reflective coating is preferably of silver and covered by protective layers of copper and paint as is well known in mirror manufacture.

In order to provide additional weatherproofing against corrosion of the reflective layer due to the ingress of water along the layer of bonding material between the mirror sheet and the backing sheet, said paint layer is preferably in turn covered by a water-proofing layer, e.g. of bitumen.

BRIEF DESCRIPTION OF THE DRAWINGS

Preferred embodiments of the invention will now be described in greater detail with reference to the accompanying diagrammatic drawings in which.

DESCRIPTION OF THE PREFERRED EMBODIMENTS

Figure 1:
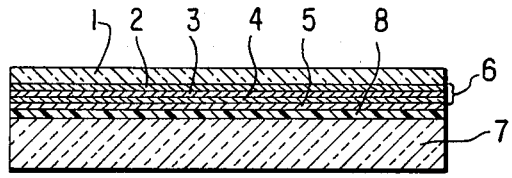
FIGS. 1 and 2 are sectional views of two embodiments of panel according to the invention.

In FIG. 1, a mirror sheet 1 of thin glass (thickness at most 1.5 mm and preferably at least 0.6 mm) bears a light reflective coating 2 of silver covered in turn by protective layers 3, 4 respectively of copper and paint. An optional waterproof layer 5 is shown applied over the paint layer 4. The silver, copper and paint layers 2, 3, 4 and the optional waterproof layer 5 e.g. of bitumen when present, together constitute a mirror coating 6 for the mirror sheet 1. The mirror sheet 1 is laminated to a backing sheet 7 of glass by means of an adhesive bonding layer 8. The backing sheet 7 is preferably of float glass and may be 5 to 6 mm in thickness which preferably has its so-called tin face adjacent the adhesive 8.

Because of the low thickness of the mirror sheet 1, such a reflective panel has a very high reflectance. A very high degree of planeity of the reflective coating 2 is ensured by the flat glass backing sheet 7 which also increases the resistance of the mirror sheet 1 to breakage.

Figure 2:
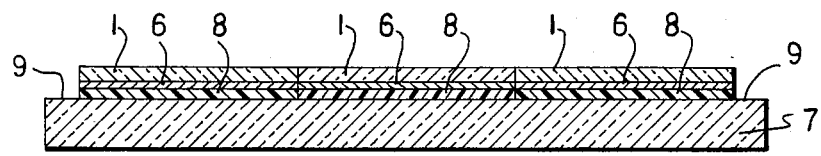
Figure 3:
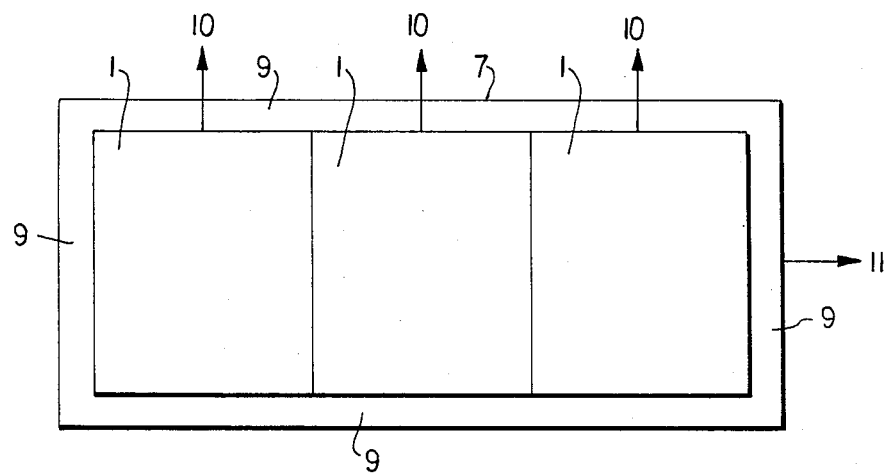
FIG. 3 is a plan view of the panel of FIG. 2.

FIGS. 2 and 3 show another reflective panel in which three mirror sheets (again indicated at 1) are bonded to a backing sheet 7 by layers of adhesive material 8. In FIGS. 2 and 3, the three mirror sheets 1 with their mirror coatings are shown as being contiguous. They could if desired be spaced apart slightly. This might be found more convenient in some assembly processes. The mirror sheets 1 are bonded to the backing sheet 7 to leave a clear margin 9 for clamping by a frame (not shown) so that the frame need not bear on the mirror sheets 1 themselves.

In FIG. 3, it will be noted that each of the mirror sheets 1 is rectangular in shape. These mirror sheets are made of drawn glass and the direction of drawing of each of these sheets is indicated by an arrow 10. These arrows 10 are parallel, in fact they all point in the same direction. The backing sheet 7 which here is a rectangular sheet of float glass has its drawing direction indicated by arrow 11. It will be noted that the drawing direction 10 of each mirror sheet 1 is perpendicular to the drawing direction 11 of the float glass backing sheet 7. This improves the planeity of each reflective mirror surface and of the panel as a whole. It will also be noted that the drawing direction of each sheet is parallel to its long sides. The mirror sheets 1 are bonded to the so-called tin face of the float glass backing sheet 7.

The panel shown in FIG. 3 is suitable for use as a heliostat. It may for example be located with the drawing direction 11 of the backing sheet 7 generally horizontal. If desired, the panel may be curved about an axis parallel to the drawing direction 10 of the mirror sheets 1.

Figure 4:
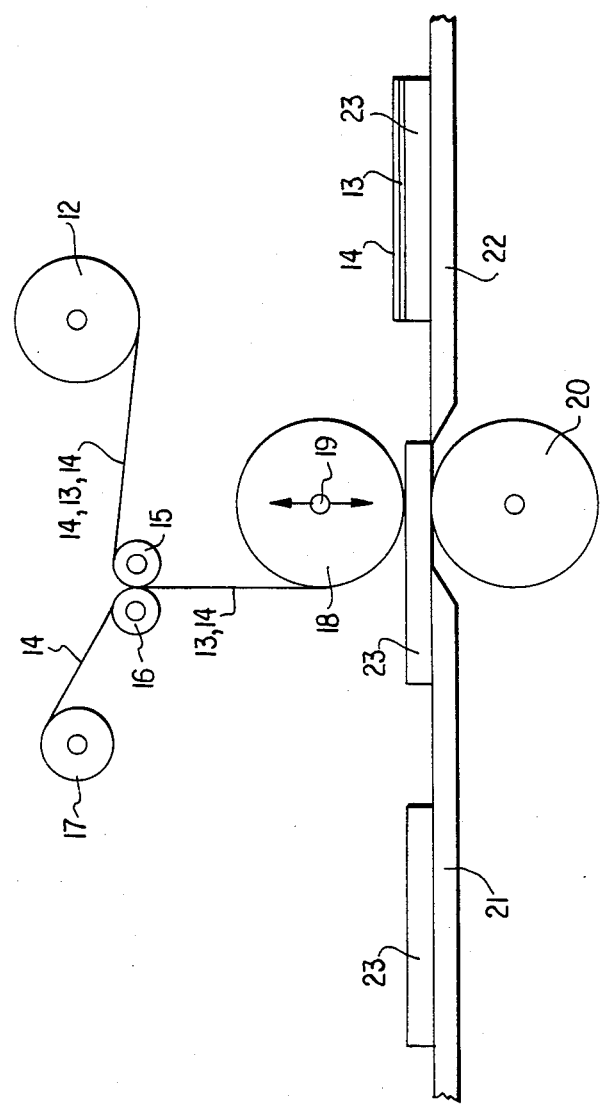
FIG. 4 shows a first stage in the manufacture of such a panel.

FIG. 4 illustrates how an adhesive layer may be applied to a glass sheet for incorporation into a panel such as is illustrated in FIG. 1 or in FIGS. 2 and 3.

In FIG. 4, a roll 12 carries a web of double sided adhesive film 13 each side of which is protected, for example by a web of siliconised paper 14. A very suitable such film is available under the Trade Mark 'MACBOND' and comprises a web of polyester 12 μm thick each of whose faces is covered by a layer of adhesive between 60 μm and 120 μm thick. The protected adhesive film 14, 13, 14 is led over a roller 15 adjacent a second roller 16 and one web of the protective paper 14 is stripped off over that roller 16 and stored on a roll 17 as waste. The adhesive film 13 now protected by only one web of paper 14 is led down to an upper calendering roller 18 whose axis 19 is vertically movable so that pressure can be exerted between that roller 18 and a fixed lower calendering roller 20. Input and output conveyor tables 21, 22 are provided to either side of the calendering rollers 18, 20 with their surfaces level with the top of the fixed lower calendering roller 20. Sheets of glass such as 23 are fed along the input conveyor table 21 to the nip of the calendering rollers 18, 20. The web of adhesive film 13 is there calendered onto the sheet 23, and that sheet passes out onto the output conveyor table 22. On the output conveyor table 22, there is shown a glass sheet 23 bearing a layer of double sided adhesive film 13 which is still protected by one layer of siliconised paper 14. In practice, the sheets 23 may be fed between the calendering rollers 18, 20 in close succession and separated on the output table 22 by cutting through the web of adhesive film 13 and protecting web of paper 14 using a knife edge (not shown). Any further trimming necessary can be carried out at a later stage as convenient. The adhesive covered sheets 23 leaving the calendering rollers 18, 20 may be thin mirror sheets or backing sheets as convenient.

Such an adhesive covered sheet can then be assembled manually to a complementary sheet to make up a reflective panel according to the invention (after, of course, stripping of the remaining protective paper 14) which is then again calendered to effect firm bonding.

Figure 5:
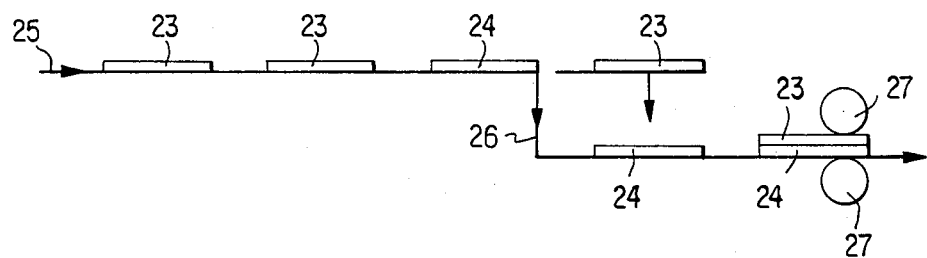
FIG. 5 shows schematically a second stage in such manufacture.

Alternatively such assembly and calendering can be performed by a more automated procedure. Such a procedure is shown in FIG. 5. In FIG. 5, glass sheets 23 which may be mirror sheets provided with adhesive for example as described with reference to FIG. 4 and complementary glass sheets 24 which would then be thicker backing sheets, for example of float glass, not provided with such adhesive are together conveyed vertically or slightly inclined to the vertical along a conveyor line 25. When an adhesive-covered sheet 23 reaches the end of that line it is halted and the protective paper sheet (14 in FIG. 4) is stripped off. Meanwhile a following sheet 24 not provided with adhesive is transferred to a second conveyor line 26 parallel with the first. When the sheet 24 reaches a position in register with the end of the first conveyor line 25, the glass sheet 23 now without its protective paper sheet (14) is brought into contact with its complementary glass sheet 24 preferably by a pivoting movement so that they adhere together and the two sheets 23, 24 then pass between a pair of vertical calendering rollers 27 to effect firm bonding.

It will be appreciated that for the manufacture of a panel as shown in FIGS. 2 and 3, the sheet 23 or the sheet 24 shown in FIG. 5 may be replaced by a plurality of mirror sheets for bonding to a common backing sheet.

It will also be appreciated that this assembly method is not limited by the composition of the sheets 23, 24 and that it may equally well be used to effect bonding between other laminates, for example glass-metal laminates including mirror-metal laminates.

We claim:

1. A solar reflecting panel forming a component of a solar concentrator, said panel comprising: a glass mirror sheet having a front surface and rear surface and a thickness of less than 2 mm, and coated on its rear surface with a reflective coating; a flat glass backing sheet having a thickness greater than that of said glass mirror sheet; and means constituted by a bonding material bonding said glass backing sheet to said rear surface of said glass mirror sheet to form said sheets into a flat laminate with the drawing direction of said glass mirror sheet being transverse to the drawing direction of said glass backing sheet.

2. A panel according to claim 1, wherein said glass backing sheet is made of float glass.

3. A panel according to claim 2, wherein said glass backing sheet is at least 4 mm thick.

4. A panel according to claim 3, wherein said glass backing sheet is 5 to 6 mm thick.

5. A panel according to claim 2, wherein said glass backing sheet is made of float glass and is laminated to said mirror sheet via its face which was in contact with a metal bath in a float tank during the manufacture of said glass backing sheet.

6. A panel according to claim 1, wherein said mirror sheet is made of drawn glass.

7. A panel according to claim 1, wherein said glass mirror sheet has a thickness between 0.6 and 1.5 mm.

8. A panel according to claim 1, wherein said body of bonding material is a thermoplastic foil having an adhesive coating, said thermoplastic foil lying between said rear surface of said glass mirror sheet and said glass backing sheet to laminate said glass mirror sheet and said glass backing sheet together.

9. A panel according to claim 1, wherein said rear surface of said mirror sheet is further coated with a copper layer and a paint layer, and said reflective coating is made of silver, said copper layer and said paint layer covering said reflective coating.

10. A panel according to claim 9, wherein said rear surface of said mirror sheet is further coated with a waterproof layer, said waterproof layer overlying said paint layer.

11. A panel according to claim 1, wherein there is a plurality of said glass mirror sheets disposed side by side and each individually bonded, by said bonding material, to said backing sheet.

12. A panel according to claim 11, wherein said plurality of glass mirror sheets is made of drawn glass and said glass backing sheet is laminated to said plurality of glass mirror sheets such that the drawing directions of said glass mirror sheets are substantially parallel.

13. A panel according to claim 12, wherein said glass backing sheet is made of float glass and said glass backing sheet is laminated to said plurality of glass mirror sheets such that the drawing direction of said glass backing sheet is transverse to the drawing direction of each of said plurality of glass mirror sheets.

14. A panel according to claim 13, wherein the drawing direction of said glass backing sheet is substantially perpendicular to the drawing direction of each of said plurality of glass mirror sheets.

15. A panel according to claim 1 wherein said body of bonding material bonds said glass backing sheet directly to said coated glass mirror sheet.

* * * * *